United States Patent [19]
Sone et al.

[11] 3,796,489
[45] Mar. 12, 1974

[54] MICROFICHE CAMERA

[75] Inventors: Yoshiharu Sone; Takao Toda; Kazuo Kashiwagi, all of Tokyo, Japan

[73] Assignee: Canon Kabushiki Kaisha, Tokyo, Japan

[22] Filed: May 25, 1972

[21] Appl. No.: 256,958

[30] Foreign Application Priority Data
May 28, 1971  Japan.............................. 46-36791
May 29, 1971  Japan.............................. 46-37132

[52] U.S. Cl................... 355/54, 226/20, 250/219 L
[51] Int. Cl.............................................. G03b 27/46
[58] Field of Search............. 355/54, 53, 41; 226/8, 226/15, 16, 20, 32, 161; 250/219 FG, 219 L

[56] References Cited
UNITED STATES PATENTS
3,591,282  7/1971  Renold................................ 355/54
3,232,547  2/1966  Thiede............................ 226/20 X
3,354,318  11/1967  Wahlstrom....................... 250/219 L
3,549,254  12/1970  Muir..................................... 355/55

Primary Examiner—Samuel S. Matthews
Assistant Examiner—Richard A. Wintercorn
Attorney, Agent, or Firm—William R. Woodward; Flynn & Frishauf

[57] ABSTRACT

A microfiche camera has a film positioning system in which a film carrier is arranged to be driven in the transverse dimension of the film. Accurate reference exposure position is assured by a light source and a photo-electric cell, one of which is on the carrier while the other has a fixed position in the camera. The registry of these elements that stops the shifting device is made precise by the use of a slit. For successive exposures lengthwise of the film, the film is pulled through the carrier by a roller drive, the load of which is kept light by maintainence of a loop on both ends of the exposure area. The loop maintainence arrangement in one form has only one photocell and light source pair for each loop chamber.

6 Claims, 17 Drawing Figures

| CLOCK PULSE NUMBER | 0 | 1 | 2 | 3 | 4 |
|---|---|---|---|---|---|
| CU1 | 0 | 1 | 0 | 1 | 0 |
| CU2 | 0 | 0 | 1 | 1 | 0 |

FIG. 9B

| CLOCK PULSE NUMBER | 0 | 1 | 2 | 3 | 4 |
|---|---|---|---|---|---|
| CU1 | 0 | 1 | 0 | 1 | 0 |
| CU2 | 0 | 1 | 1 | 0 | 0 |

FIG. 9C

| STEP | a | b | c | d |
|---|---|---|---|---|
| 1 | 1 | 1 | 0 | 0 |
| 2 | 0 | 1 | 1 | 0 |
| 3 | 0 | 0 | 1 | 1 |
| 4 | 1 | 0 | 0 | 1 |
| 5 | 1 | 1 | 0 | 0 |

MICROFICHE CAMERA

BACKGROUND OF THE INVENTION

1. Field of the Invention

The present invention relates to a microfiche camera of the type capable of recording a large number of data images in row and column upon a microfilm.

2. Description of the Prior Art

In microfilming, two types of films are generally used. One is a rolled microfilm, and the other, a flat sheet or card microfilm. When the data are recorded in the microfiche type, the film must be displaced or shifted both in longitudinal and transverse directions. Therefore, cameras become complex in construction and expensive and are very slow in photography. Cameras having a flat bed or rotary feed are used to photograph the data on a rolled microfilm only in one row. When the data are photographed in fiche type on a rolled microfilm both the film carrier and the lens must be stopped at a reference position with a higher degree of accuracy.

In microfilming, a film carrier must be generally shifted in the transverse direction of the microfilm roll in order to sequentially record the data in the frames in one column and then shifted in the longitudinal direction to the next column and then in the transverse direction to the uppermost row so that the data may be sequentially recorded in the next column. The shift or displacement of the film carrier in the transverse and longitudinal directions according to the predetermined program must be controlled with a higher degree of accuracy so that the data may be recorded on the microfiche in a predetermined frame pattern. Furthermore, the microfilm carried by the microfilm carrier must be stopped within a very short time precisely at an exposure position and held stationary and flat for recording the data in each frame. In the conventional microfiche cameras, the mechanical limit switches such as microswitches are generally used in order to detect the position of the film carrier and to control the shift thereof. However, the mechanical microswitches generally have a switching hysteresis so that the error in detection of the position of the film carrier and hence the error in control of the film carrier shift tend to gradually increase. As a consequence the precise control of the shift of the film carrier is not expected. Furthermore, the limit switches must have a long service life.

In addition, the microfilm roll must be transported and shifted in the transverse direction at higher speed for example when the output of the electronic computer is directly recorded by the computer output microfilming. In some case, the microfilm is required to be intermittently transported in both forward and reverse directions. Therefore, in the conventional cameras, the film loops are formed on both sides of the exposure section in the camera to provide the buffer action against the change in tension of the film being transported.

In this case, a film loop formation chamber is provided as a tape buffer storage between the film supply chamber and the exposure section in order to mechanically isolate the film driving or transporting device from the sluggish film supply reel which has a great intertia. The film loop in the film loop chamber is so controlled that a predetermined length of the film loop may be always maintained even when the film is transported at high speed or the film is at rest. In the conventional microfishe cameras, both the vacuum column method and the tension arm method have been employed to control the film loop.

In the tension arm method, the rapid change in tension of the film when the latter is started or in the transient period is absorbed by the tension arm so that the load of the film drive device may be maintained constant. The supply and take-up of the film may be controlled in response to the position of the tension arm so that the predetermined length of the film loop may be maintained. In the vacuum column method, the vacuum columns are provided as a tape buffer storage as in the case of the magnetic tape storage devices so that a predetermined length of the film loop may be stored in the vacuum columns. The supply and take-up of the film are accomplished by the servomechanism. However, in the tension arm method described above, the film is transported upon the tension arm so that it is firmly pressed against the tension arm when the sudden change in tension of the film occurs. As a result, the surface of the film tends to be damaged. Furthermore, since the tension arm is displaced in response to the tension of the film being transported, the response of the tension arm method is very slow. In vacuum column buffering method, the film loop may be controlled with a higher degree of accuracy and with a faster response, but the device is inevitably complex in construction and very expensive in cost.

SUMMARY OF THE INVENTION

One of the objects of the present invention is therefore to overcome the problems encountered in the prior art microfiche cameras.

Another object of the present invention is to provide a microfiche camera capable of recording the data with the higher density upon a film in row and column.

Another object of the present invention is to provide a microfiche camera in which a microfilm may be stopped at an exposure position with a higher degree of accuracy.

Another object of the present invention is to provide a microfiche camera in which a microfilm may be supplied to and placed at an exposure starting position.

Another object of the present invention is to provide a microfiche camera in which a predetermined film loop may be always maintained.

Another object of the present invention is to provide a microfiche camera in which a microfiche may be shifted or dsplaced transversely.

The above and other objects, features and advantages of the present invention will become more apparent from the following description of the preferred embodiments thereof taken in conjunction with the accompanying drawings.

DESCRIPTION OF THE PREFERRED EMBODIMENTS

Figure 1A:
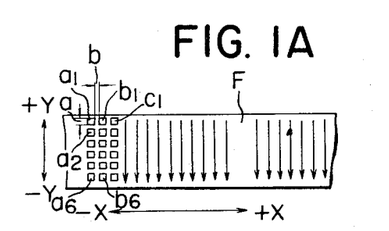
FIGS. 1(A) and 1(B) are views used for explanation of the microfiche photography using a rolled microfilm.
Figure 1B:
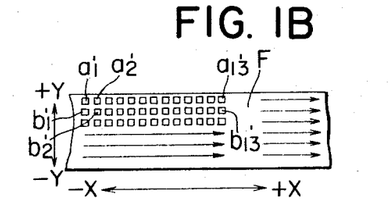

Prior to the description of the preferred embodiment of the microfiche camera in accordance with the present invention, the sequence for recording the data on the film in row and column will be described with reference to FIGS. 1(A) and 1(B). In this case, it is assumed that a film carrier is shifted or displaced relative to a photolens of the camera. Referring to FIG. 1(A), the film carrier is so intermittently shifted relative to the photolens that the data are recorded sequentially in the frames $a_1 - a_6$ in the first column. That is, the microfilm F is shifted or displaced in the direction indicated by the arrow -Y. After the frame $a_6$ at the lowermost row has been exposed, the microfilm F is shifted in the longitudinal direction indicated by the arrow +X by a distance equal to the width of each frame plus the spacing between the adjacent frames $b$ and then shifted in the transverse direction indicated by the arrow +Y to the initial position or reference position $b_1$ in the next column. Then the data may be again sequentially recorded in the frames $b_1 - b_6$ in the second column. Alternatively, as shown in FIG. 1(B), the microfilm F is intermittently shifted in the longitudinal or forward direction indicated by the arrow +X so that the data may be recorded in the frames $a_1' - a_{12}'$ in the uppermost or first row. After the last frame $a_{12}'$ has been exposed, the microfilm F is shifted in the transverse direction indicated by the arrow -Y by a distance equal to the height of the frame plus the spacing between the adjacent frames to the next row and then shifted in the longitudinal or reverse direction indicated by the arrow -X to the initial position or reference position $b_1'$ in the second row. Then, the data may be sequentially recorded in the frames $b_1' - b_{12}'$.

Figure 2:
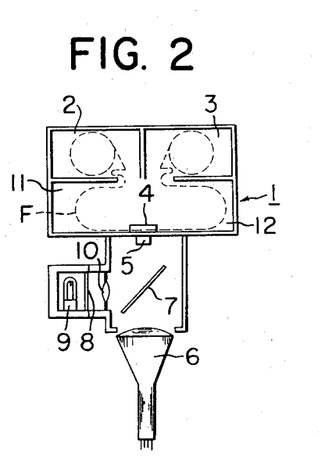
FIG. 2 is a schematic sectional view of a microfiche camera in accordance with the present invention.

Now referring to FIG. 2, the preferred embodiment of a microfiche camera in accordance with the present invention applied to a computor output microfilming device will be described. The microfiche camera 1 generally comprises a film supply chamber 2 in which a film supply reel is loaded, another film chamber 3 in which a film take-up reel is loaded, an exposure section 4, and a camera lens 5. The computor output microfilming device generally comprises the microfiche camera 1, a cathode ray tube 6, a half mirror 7 interposed between the camera lens 5 and the cathode ray tube 6, and a format 8 with a predetermined pattern whose light image is superimposed upon the light image displayed by the cathode ray tube 6 by a projection system comprising a light source 9 and a projection lens 10.

The film supplied from the film supply reel in the supply chamber 2 is looped in a film loop formation chamber 11 before it is transported into the exposure section 4. In a similar manner, the exposed film is also looped before it is taken up by the take-up reel in the chamber 3. The images displayed by the cathode ray tube 6 are sequentially exposed upon the film F through the camera lens 5 while a film carrier in the exposure section 4 is displaced transversely of the film F in a manner to be described in more detail hereinafter so that the images are formed in row and column as shown in FIG. 1.

It will be understood that instead of the film supply and take-up reels, film magazines may be removably mounted into the camera 1.

Figure 3:
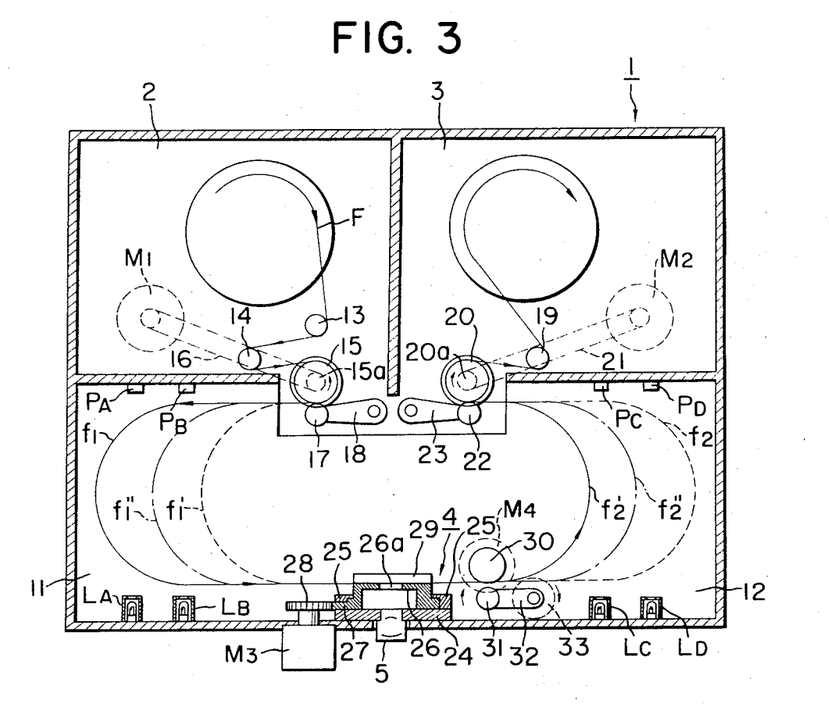
FIG. 3 is a sectional view thereof on enlarged scale illustrating the details.

Next referring to FIG. 3, the microfiche camera 1 will be described in more detail hereinafter. The film F is directed by a pair of movable guide rollers 13 and 14 toward a supply capstan 15 around the periphery of which is bonded rubber and which is carried by a shaft which also carries a pulley 15a. The pulley 15a is drivingly coupled to a motor $M_1$ with a belt 16. A pinch roller 17 which is carried by a lever 18 which is normally biased to rotate in the clockwise direction is pressed against the capstan 15 with the film F interposed therebetween. Therefore when the motor $M_1$ is driven the film F is transported by the capstan 15 and the pinch roller 17 toward the exposure section 4. Similarly a film transport mechanism comprising a guide roller 19, a film take-up capstan 20, a pulley 20a, a pinch roller 22 carried by a lever 23, a belt 21, and a motor $M_2$ is disposed in the film take-up chamber 3.

Figure 4:
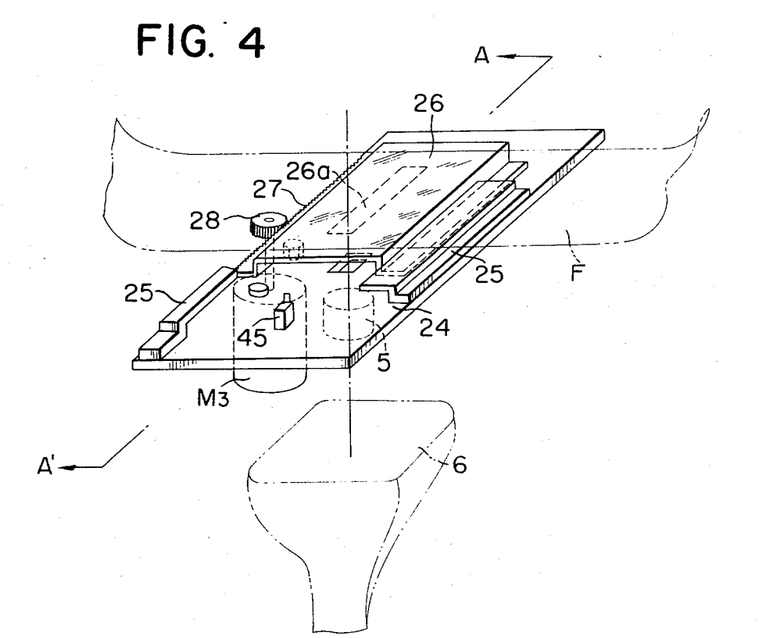
FIG. 4 is a perspective view illustrating an exposure section of the microfiche camera shown in FIG. 3.

Next referring to FIGS. 3 and 4, the exposure section 4 will be described in more detail. Upon a lens holder 24 upon which is mounted the photo lens 5 are disposed a pair of parallel guides 25 between which is slidably disposed a film carrier 26 for movement transversely of the film F. The film carrier 26 has an aperture 26a which is substantially equal in size to one frame of the film F, and a toothed side edge 27 in engagement with a gear 28 carried by the shaft of a pulse motor $M_3$. The flatness of the film F when exposed is ensured by a pressure plate 29. A film drive capstan 30 carried by the rotary shaft of a motor $M_4$ may be selectively engaged with a pinch roller 31 carried by an actuating member 32 of a rotary solenoid 33.

The film F is transported from the supply reel in the film chamber 2 through the pair of guide rollers 13 and 14, the capstan 15, the pinch roller 17, the space between the film pressure plate 29 and the film carrier 26, the capstan 30, the pinch roller 31, the capstan 20, the pinch roller 22 and the guide roller 19 to the take-up reel in the film take-up chamber 3.

Figure 10:
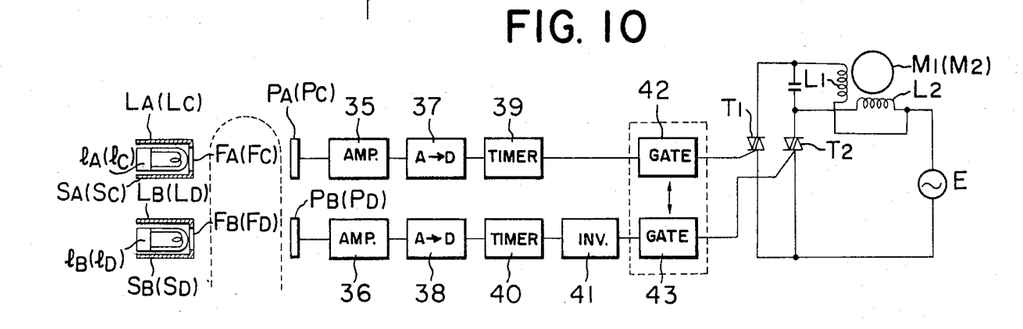
FIG. 10 is a block diagram of a film drive control circuit of the microfiche camera shown in FIG. 3.
Figure 11:
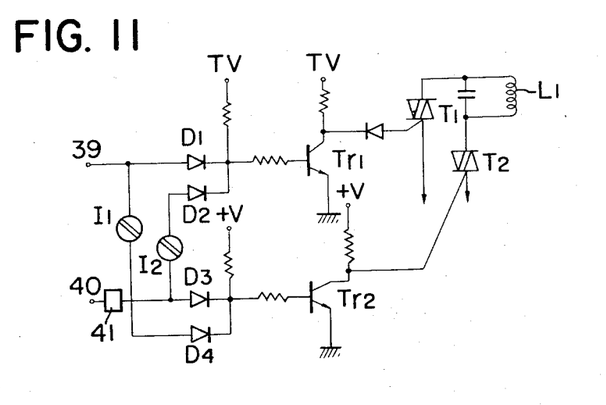
FIG. 11 is a diagram of AND gate circuits in the block diagram shown in FIG. 10.

In the film loop formation chamber 11, light sources $L_A$, $L_B$, $L_C$ and $L_D$ are disposed. As best shown in FIG. 10, the light sources comprise the light shielding cylinders $s_A - S_D$, the tungsten filament lamps $l_A - l_D$, and the optical filters $F_A - F_D$ disposed at the opening of the light shielding tubes $L_A - L_D$ capable of transmitting the electromagnetic waves of about 800 micro-microns in wavelength. That is, the filters $F_A - F_D$ transmits the light to which the film F is insensitive so that the undesired exposure of the film F may be avoided. Any type of filter such as color filters or interference filters may be used.

In opposed relation with the light sources L are disposed photoelectric cells $P_A$, $P_B$, $P_C$ and $P_D$ respectively in the chamber 11 which respond only to the light transmitted through the filters F of the light sources L. The photoelectric cells may be phototransistors, photovoltatic cells or the like.

In conjunction with the photoelectric cells P there is provided a film loop control circuit shown in FIG. 10. The control circuit comprises two amplifiers 35 and 36, analog-to-digital converters such as Schmitt circuits 37 and 38, electronic timer circuits 39 and 40 which may generate the output signals for a predetermined time in response to the input signals applied thereto, an inverter 41, gate circuits 42 and 43, triacs $T_1$ and $T_2$ whose conductions are controlled in response to the signals from the gate circuits 42 and 43, and field coils $L_1$ and $L_2$ of the motor M.

The gate circuits 42 and 43 are illustrated in more detail in FIG. 11. The outputs of the timer circuits 39 and 40 are applied to the bases of the switching transistors $Tr_1$ and $Tr_2$ through inverters $I_1$ and $I_2$ and AND circuits comprising diodes $D_1$ and $D_2$; and $D_3$ and $D_4$. The collectors of the transistors $Tr_1$ and $Tr_2$ are connected to the gates of the triac $T_1$ and $T_2$ respectively.

Next referring back to FIG. 3, when the start button (not shown) is depressed after the film F has been loaded in the camera along the path $f_1$ and $f_2'$ indicated by the solid lines, the motor $M_3$ starts to rotate in response to the signal from a film carrier control circuit to be described in more detail hereinafter. Therefore, the film carrier 26 is shifted or displaced transversley of the film F and is stopped when the film F is so positioned relative to the photo lens 5 that the image is focused on a frame a, b, .... in the first row on the film F (See FIG. 1). When the images are exposed sequentially in the Y direction as shown in FIG. 1(A), the film F held by the pressure plate 29 and the film carrier 26 is displaced by a distance equal to the height a of the frame in the +Y direction in response to the sync signal respresentative of the change of the image displayed on the faceplate of the cathode ray tube 6. After the frame $a_6$ has been exposed, the rotation of the motor $M_3$ is reversed in response to the signal from the film carrier control circuit so that the film carrier 26 is reversed in the -Y direction to the initial position. Thereafter, in response to the sync signal representative of the change of the image displayed on the faceplate of the cathode ray tube 6, the rotary solenoid 33 as well as the motor $M_4$ are energized to rotate the film drive capstan 30 in order to advance the film F in the +X direction by a distance equal to the width b of the frame. When the above operations are cycled, the desired data images are recorded sequentially, and the length of the film loop F in the chamber 11 is decreased as indicated by the chain line $f_1''$ whereas the length of the film loop in the chamber 12 is increased as indicated by the chain line $f_2''$. Therefore, the photoelectric cells $P_A$ and $P_B$ may now intercept the light beams from the light sources $L_A$ and $L_B$ respectively so that the outputs of the photoelectric cells are applied through the amplifiers 35 and 36 and the A-D converters 37 and 38 to the electronic timer circuits 39 and 40. In response to the signal from the timer circuit 39, the positive gate input is applied for a predetermined time interval to the diode $D_1$ in the AND circuit of the gate circuit 42. The output signal of the electronic timer circuit 40 is inverted by the inverter 41 and is further inverted by the inverter $I_2$ in the gate circuits 42 and 43 so that the positive signal is applied to the diode $D_2$ of the AND circuit of the gate circuit 42. As a result the output of the AND circuit $D_1$ and $D_2$ is applied to the base of the transistor $Tr_1$ so that the latter is made conductive. Therefore the triac $T_1$ is made conductive so that the current is supplied from an a-c power source E to the field winding $L_1$. The motor M rotates in the clockwise direction so tha the film supply capstan 15 rotates in the clockwise direction. Hence the film F is supplied into the chamber 11 from the film supply chamber 2 so that the film loop in the chamber 11 may be increased. As described above, since the capstan is driven for a time interval determined by the electronic timer circuit 39, the supply of the film F into the chamber 11 is stopped after said predetermined time interval. The electronic timer circuits 39 and 40 are so designed as to drive the motor and hence the capstan 15 for a predetermined time after the light from the light source $L_B$ has been intercepted by the photoelectric cell $P_B$ so that the desired length of the film loop may be formed in the chamber 11.

When the loop of the film F is increased in the chamber 11 so that the light from the light sources $L_A$ and $L_B$ is prevented by the film F from falling onto the photoelectric cells $P_A$ and $P_B$, no output is derived from the photoelectric cells $P_A$ and $P_B$ so that the triac $T_1$ is cut off. As a result, the motor M and hence the capstan 15 are stopped. In this case, the positive signal is applied to the input terminal of the gate circuit 43 because the negative signal from the electronic timer circuit 40 is inverted into the positive signal by the inverter 41 whereas the positive signal inverted by the inverter $I_1$ is applied to the diode $D_4$ in the AND circuit. As a result, the output of the AND gate $D_3$ and $D_4$ is derived so that the transistor $Tr_2$ is made conductive. Hence the triac $T_2$ is conducted so that the field winding $L_2$ is energized. The motor M is reversed so that the capstan 15 serves to reverse the film F into the film supply chamber 2. Therefore, the loop in the chamber 11 is gradually decreased. However, when the light from the light source $L_A$ is again intercepted by the photoelectric cell $P_A$ as the loop of the film F is decreased, the output signal is derived from the timer circuit 39 so that the triac $T_2$ is cut off. Hence the motor M is stopped. Thus, the film transportation is so controlled that the predetermined length of the film loop may be always maintained in the chamber 11 as indicated by the chain line $f_1''$.

In like manner the loop in the chamber 12 is so controlled by the control system similar to that described with reference to FIGS. 10 and 11 that the vertex of the loop may be maintained between the midpoint between the photoelectric cells $P_C$ and $P_D$ as indicated by $f_2''$ in FIG. 3.

Figure 5:
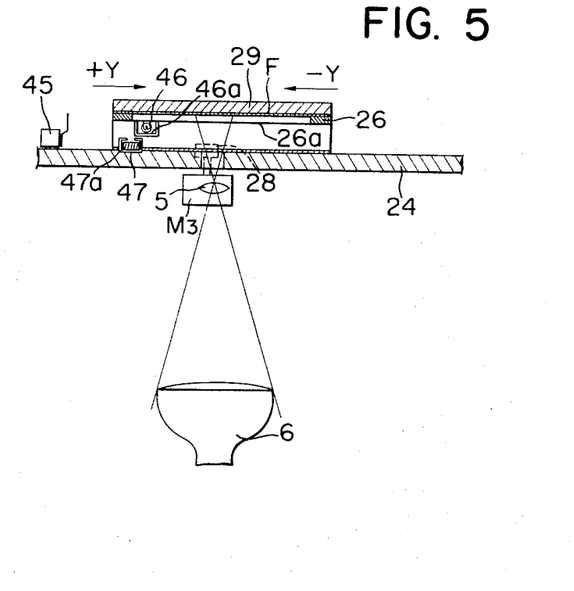
FIG. 5 is a sectional view taken along the line A—A' of FIG. 4.

Next referring back to FIGS. 4 and 5, the film carrier 26 is displaced by the motor $M_3$ transversely of the film F, that is in the +Y directions in FIG. 1. In response to the pulse applied from the control circuit (not shown) to the motor $M_3$ whenever the image displayed on the faceplate of the cathode ray tube 6 is changed, the film carrier 26 is displaced transversely of the film by a distance equal to the spacing between the adjacent frames $a_1$ and $a_2$ and so on. A microswitch 45 mounted on the lens holder 24 is turned on by the engagement of its actuator with one side edge of the film carrier 26, so that the end of the stroke of the film carrier 26 may be detected. A light source generally denoted by 46 and disposed upon the undersurface of the film carrier 26 comprises a tungsten filament lamp and a slit 46a for directing the light from the lamp toward a photoelectric cell chamber 47 which is mounted on the lens holder 24 and in which is disposed a photoelectric cell such as CdS element, photodiode or the like. The light source 46 and the photoelectric cell chamber 47 are so located that when the light from the light source 46 is intercepted by the photoelectric cell 47a in the chamber 47, the center of the film carrier 26 coincides with the axis of the photo lens 5 mounted on the lens holder 24.

Figure 6:
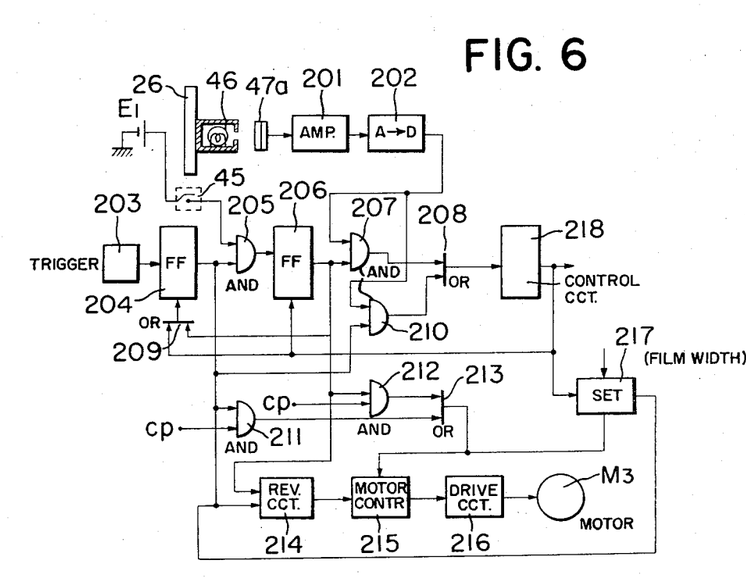
FIG. 6 is a block diagram of a control circuit for controlling the displacement or shift of a film carrier of the microfiche camera shown in FIG. 3.

Next referring to FIG. 6, the control circuit for controlling the displacement of the film carrier 26 will be described. In the instant embodiment, the motor $M_3$ is a pulse motor. The control circuit generally comprises an amplifier 201 for amplifying the output of the photoelectric cell 47a, an analog-to-digital converter 202 such as a Schmitt circuit, a trigger circuit 203 which generates the positive signal in response to the start button (not shown), a first command circuit for causing the motor $M_3$ to rotate in the clockwise or forward direction, the first command circuit being a flip-flop whose set input terminal is connected to the output terminal of the trigger circuit 203, an AND gate circuit 205 one of the input terminals of which is connected to the set output terminal of the flip-flop 204 and the other input terminal of which is connected to the microswitch 45 which in turn is connected to a d-c power source $E_1$, a second command circuit 206 for causing the motor $M_3$ to rotate in the counterclockwise or reverse direction which may be a flip-flop as is the case of the first command circuit, an AND gate circuit 207, OR gate circuits 208 and 209, the output terminal of the OR gate circuit 209 being connected to the reset input terminal of the first command circuit 204, AND gate circuits 210, 211 and 212, the clock pulses being applied to one of the input terminals of the AND gate circuits 211 and 212 from a control circuit (not shown), an OR gate circuit 213, a rotation reversing circuit 214 for reversing the rotation of the motor $M_3$ which may be a flip-flop, a motor control circuit 215, a motor driving circuit 216, and a conventional film width setting circuit 217 which may be a conventional preset counter so that it may be set to apply the control pulses at a predetermined time interval to the control circuit 215.

Figure 7:
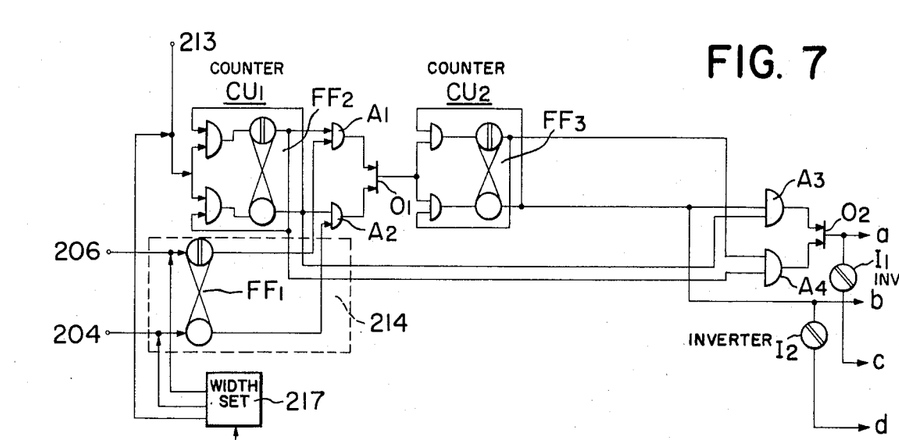
FIG. 7 is a diagram of a motor control circuit in the film carrier control circuit shown in FIG. 6.

The arrangements of the motor rotation reversing circuit 214 and the motor control circuit 215 are illustrated in more detail in FIG. 7. The reversing circuit 214 comprises a conventional flip-flop $FF_1$ the state of which is reversed in response to the trigger signals from the first and second command circuits 204 and 206. The motor control circuit 215 comprises flip-flops $FF_2$ and $FF_3$ which constitute counters $CU_1$ and $CU_2$ respectively, logic circuits $A_3$, $A_4$ and $O_2$ and inverters $I_1$ and $I_2$.

Figure 8:
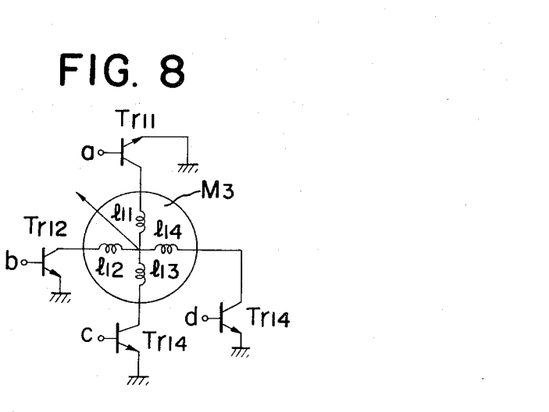
FIG. 8 is a diagram of a motor driving circuit in the film carrier control circuit shown in FIG. 6.

The arrangement of the motor driving circuit 216 is illustrated in more detail in FIG. 8. The motor driving circuit 216 comprises four transistors $Tr_1 - Tr_4$, and feeds the driving current to the field windings $l_1 - l_4$ of the pulse motor $M_3$ in response to the outputs a, b, c and d of the motor control circuit 215 which are applied to the bases of the transistors $Tr_1 - Tr_4$.

Figure 9A:
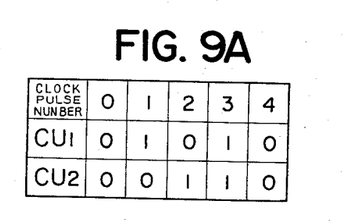
FIG. 9(A), 9(B) and 9(C) are charts used for explanation of the mode of operation of the motor control circuit shown in FIG. 7.
Figure 9B:
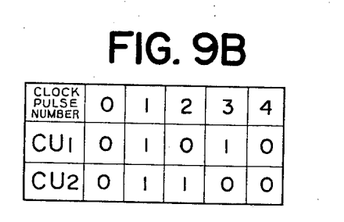
Figure 9C:
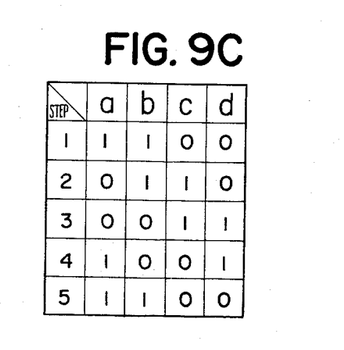

Next the mode of operation of the control circuit for controlling the displacement of the film carrier 26 will be described. In response to the depression of the start button (not shown), the trigger signal is generated by the trigger circuit 203 and is applied to the flip-flop in the first command circuit 204 so that the flip-flop is set. As a result, the flip-flop $FF_1$ in the rotation reversing circuit 214 is reset so that the signal is applied to the input terminal of the AND gate circuit $A_2$. The flip-flop $FF_2$ of the counter $CU_1$ has its states reversed in response to the clock pulses applied thereto through the AND gate 211 and the OR gate 213. Whenever the flip-flop $FF_2$ is reset, the output signal is applied to the OR gate circuit $O_1$. The state of the flip-flop $FF_3$ is reversed in response to the output signal from the OR gate $O_1$. In summary, the states of the flip-flops $FF_2$ and $FF_3$ or counters $CU_1$ and $CU_2$ are reversed in response to the clock pulses as shown in FIG. 9(B), and the driving pulses appear at the output terminals a, b, c and d of the motor control circuit 215 as shown in FIG. 9(C). As a result, the field windings of the pulse motor $M_3$ are energized in the order shown in FIG. 9(C) so that the motor $M_3$ is rotated in the clockwise direction. Hence the film carrier is displaced in the -Y direction in FIG. 5.

When the light from the light source 46 passing through its slit 46a is intercepted by the photoelectric cell 47a as the film carrier 26 is displaced, the output of the photoelectric cell 47a is applied to the gate circuit 210 through the amplifier 201 and the A-D converter 202 so that the output signal of the gate circuit 210 is applied though the OR gate 208 to an exposure start control circuit 218 which may be comprised of a flip-flop. Therefore, the exposure start control circuit 218 is set. The output signal of the control circuit 218 is applied through the OR gate 209 to reset the first command circuit 204. As a result, the motor control circuit 215 is deenergized so that the motor $M_3$ is stopped. Hence the film carrier 26 is stopped at a reference position. In response to the output signal of the control circuit 218, the circuit 217 which has been preset in response to the width of the film being used, applies to the motor control circuit 215 a predetermined number of pulses which represents the width of the film used. In this case, the control pulse representing the rotation of the motor in the clockwise direction is applied to the rotation reversing circuit so that the motor $M_3$ is rotated through a predetermined angle. As a result, the film carrier 26 is displace in the -Y direction so that the photo lens 5 may project the light image upon the frame in the first row (See FIG. 1).

Next referring back to FIG. 5, the film carrier 26 is assumed to have been displaced in the -Y direction and stopped in such a position that the light from the light source 46 cannot be intercepted by the photoelectric cell 47a. In this case, upon depression of the start button the film carrier 26 is further displaced in the -Y direction until the side edge of the film carrier engages with the actuating member of the microswitch 45 to turn on the same. Then the output signal from the AND gate circuit 205 is applied to the second command circuit 206. The command circuit 206 is set whereas the first command circuit 204 is reset so that the motor $M_3$ is stopped. When the second command circuit 206 is set, the flip-flop in the rotation reversing circuit 214 is set so that the clock pulses are applied to the motor control circuit 215 through the AND gate circuit 212 and the OR gate circuit 213. As a result, the states of the counters $CU_1$ and $CU_2$ are reversed in the order shown in FIG. 9(A) and the pulse motor $M_3$ starts to rotate in the counterclockwise direction. Hence, the film carrier 26 is displaced in the +Y direction. However, when the light from the light source 46 is again intercepted by the photoelectric cell 47a, the pulse motor $M_3$ is stopped so that the film carrier 26 is stopped again at the reference position. Thereafter in response to the signal from the control circuit 218 through the setting circuit 217, the motor $M_3$ reverses its rotation so that the film carrier 26 is again displaced in the -Y direction by a distance equal to the width of the film F. That is, in response to the signal from another control circuit (not shown) the pulse motor $M_3$ rotates through such an angle that the film carrier 26 may be displaced by a distance equal to the spacing between the adjacent frames on the film whenever the exposure is made. Upon completion of the last exposure of the lowest frame $a_6$ in one column (shown as consisting of six frames $a_1 - a_6$ in FIG. 1), the film carrier 26 is stopped at the reference position in the manner described hereinbefore, and then the next exposure is made. The control circuit for controlling the exposure of the frames does not constitute the present invention so that no description will be made in this specification.

In the instant embodiment, the film carrier 26 has been illustrated and described as being movable relative to the photo lens 5, but it will be understood that the photo lens may be so arranged as to move relative to the film carrier in a manner substantially similar to that described above. The film carrier has been described as being stopped at the reference position in which the center of the carrier frame coincides with the optical axis of the camera lens and then being displaced by a distance equal to the width of the film used, but it should be understood that when only one type of the film is used, the reference position may coincide with the position from which the exposure is started so that the exposure may be made immediately when the film carrier has been stopped.

Figure 12:
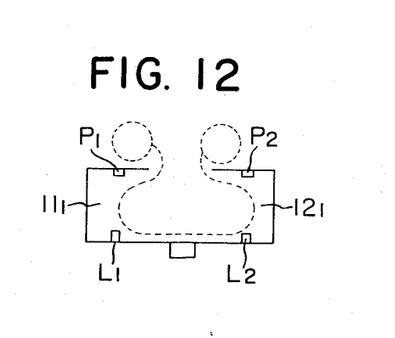
FIG. 12 is a schematic view illustrating a variation of a film loop control system in accordance with the present invention.

Next referring to FIGS. 12 and 13, a variation of a film loop control system will be described hereinafter in which only two pairs of the light sources and photoelectric cells are disposed in the film loop chamber. More particularly as shown in FIG. 12 the light source $L_1$ is disposed in opposed relation with the photoelectric cell $P_1$ in the chamber 11 whereas the light source $L_2$, in opposed relation with the photoelectric cell $P_2$ in the chamber 12.

Figure 13A:
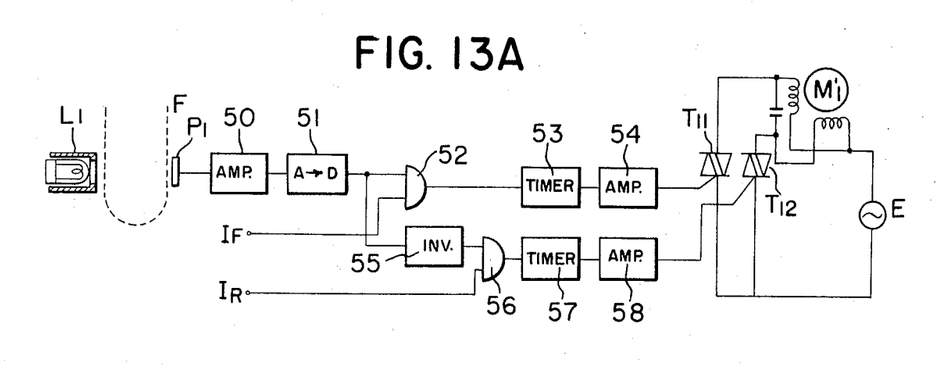
FIGS. 13(A) and 13(B) are block diagrams of control circuits for controlling a film supply capstan and a film take-up capstan, respectively.

The film loop control system (see FIG. 13(A)) on the side of the chamber 11 generally comprises the light source $L_1$, the photoelectric cell $P_1$, an amplifier 50, an analog-to-digital converter 51, an AND gate 52, an electronic timer circuit 53, a power amplifier 54, a triac $T_{11}$, an inverter 55, an AND gate 56, an electronic timer circuit 57, a power amplifier 58 and a triac $T_{12}$. To one of the two input terminals of the AND gate 52 is applied the output of the A-D converter 51 whereas to the other input terminal is applied the signal representing the clockwise rotation (that is, in the +X direction) of the film drive capstan (which corresponds to the capstan 30). To one of the two input terminals of the AND gate 56 is applied the output signal from the inverter 55 whereas to the other input terminal is applied the signal representing the counterclockwise rotation (that is, in the -X direction) of the capstan. The outputs of the power amplifiers 54 and 58 are applied to the gates of the triacs $T_{11}$ and $T_{12}$, respectively. The circuit arrangements of the electronic timer circuits 53 and 57, the triacs $T_{11}$ and $T_{12}$ and the motor $M_1'$ for driving a film supply capstan (corresponding to the capstan 15) are similar to those of the embodiment described with reference to FIGS. 1–11.

The (film drive) capstan (which corresponds to the capstan 30) is rotated in the counterclockwise or reverse direction when the images are recorded on the film F as shown in FIG. 1(B). That is, the images displayed on the cathode ray tube are sequentially recorded in the image frames on the film F in the +X direction. When the last image frame for example $a_{13}$, is exposed, the film F is displaced in the +Y direction by a distance equal to the spacing between the adjacent image frames and then displaced in the -X direction. The control circuit for controlling phototaking does not constitute the present invention so that no description will be made in this specification. In summary, in response to the clockwise or forward and counterclockwise or reverse rotations of the film drive capstan, the control signals $I_F$ and $I_R$ are generated and applied to the AND gates 52 and 56 respectively.

Figure 13B:
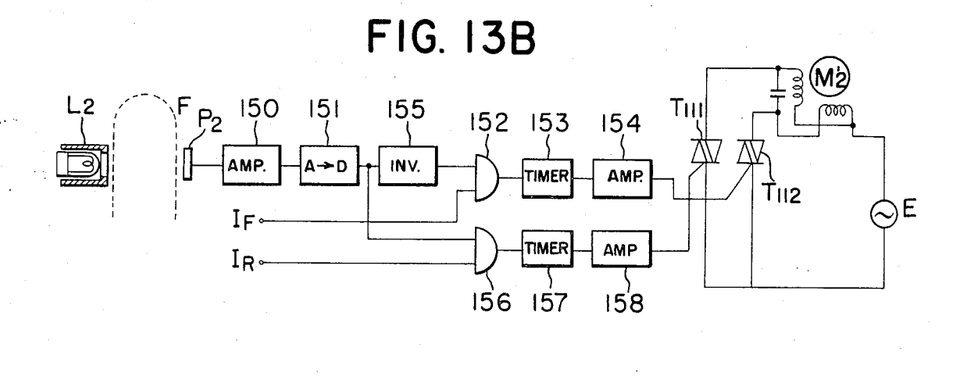

The film loop control system (See FIG. 13(B)) on the side of the chamber $12_1$ is substantially similar to that on the side of the chamber $11_1$ except that an inverter 155 is interconnected between an analog-to-digital converter 151 and an AND gate 152 so that the component parts in the film loop control system on the side of the chamber $12_1$ are denoted by the reference numerals used to denote the corresponding circuits in FIG. 13(A) plus 100.

Next the mode of operation will be described. The film loop in the chamber $11_1$ is gradually decreased as the film is transported into the chamber $12_1$ by the capstan and the pinch roller (corresponding to the pinch roller 31) after the exposure in the exposure section (corresponding to the exposure section 4) so that the light from the light source $L_1$ is intercepted by the photoelectric cell $P_1$ so that the output of the A-D converter is applied to one input terminal of the AND gate 52. Since the film drive capstan rotates in the clockwise or forward direction, the signal $I_F$ is applied to the other input terminal of the AND gate 52 as described hereinbefore. As a result, the output of the AND gate 52 is applied to the gate of the triac $T_{11}$ through the electronic timer circuit 53 and the power amplifier 54 so that the triac $T_{11}$ is conductive. Therefore the motor $M_1'$ rotates in the clockwise direction so that the film supply capstan (15, See FIG. 3) rotates in the clockwise direction. As the result, the film F is fed into the chamber $11_1$ so that the length of the film loop is increased. The reverse signal or counterclockwise rotation signal $I_R$ is applied to one of the input terminals of the AND gate 56 whereas the output of the A-D converter 51 which is inverted by the inverter 55 is applied to the other input terminal so that the AND gate 56 is opened to apply the output signal to the gate of the triac $T_{12}$ through the electronic timer circuit 57 and the power amplifier 58. The triac $T_{12}$ is conductive so that the motor $M_1'$ is caused to reverse the direction of rotation. Therefore, the film supply capstan (15) is reversed in rotation so that the film F in the chamber $11_1$ is returned into the film supply chamber 2. As the film F in the film loop chamber $11_1$ is decreased in the manner described above, the light from the light source $L_1$ is again intercepted by the photoelectric cell $P_1$ so that the signal is not applied to the other input terminal of the AND gate 56. There is no output signal from the AND gate 56 so that the triac $T_{12}$ is cut off so that the motor $M_1'$ is stopped. Therefore the reverse of the film F is stopped.

In like manner, the film take-up capstan (20, See FIG. 3) is reversed in rotation in response to the forward or reverse rotation of the film supply capstan (15, See FIG. 3) so that the predetermined film loop length may be always maintained in the film loop chamber $12_1$.

In the embodiment and variation described above, the individual light sources $L_A - L_D$, $L_1$ and $L_2$ are disposed but it will be understood that only one light source may be provided in such a manner that the light may be transmitted through a plurality of optical paths toward the photoelectric cells by optical fibers, reflecting mirrors or the like.

As described above, according to the present invention the film carrier movement can be controlled with a greater degree of accuracy so that the film may contain a large number of images recorded in rows with a high density. Furthermore the predetermined film loop may be always maintained in the film loop chamber so that even when the film is displaced transversely, it may be always maintained in parallel with the image to be microfilmed and that the film may be transported with a high speed.

The light receiving element in the loop room is placed opposite to the film exposure surface is parallelly moved:

So far only the preferred embodiment and variation thereof have been described, but it should be understood that various modifications and variations can be effected without separating the spirit of the present invention.

We claim:

1. In a microfiche camera of the type comprising means for transporting an unexposed film means for taking up the exposed film, optical means, means for shifting the film transversely thereof relative to said optical means in an exposure position, and means for forming the film loop, whereby a large number of data images are recorded in row and column on the film with a wider width, an improvement of said film shifting means comprising a  a film carrier member for holding the film in said exposure position arranged opposite to said optical means, b  means for driving said carrier member transversely of the film, c  a light source means for generating a light beam, d  light receiving means disposed in a predetermined position relative to said carrier member and said optical means for receiving said light beam from said light source means to generate an electrical signal, wherein one of either of said light source means or said light receiving means is mounted on said film carrier member to move in unison therewith, while the other is disposed in the path of movement of said carrier member, and e  control means coupled to said light receiving means for stopping said driving means, whereby when said light receiving means receives said light beam by the relative movement between said carrier member and light receiving means, said driving means is stopped by said electric signal generated by said light receiving means to stop said film carrier member at a reference relative position with said optical means.

2. An improvement as set forth in claim 1, wherein said light source means comprises a light source mounted upon said film carrier member in opposed relation with said optical means and a slit disposed in front of said light source, said light receiving means comprises a sole photoelectric cell which generates an electrical signal when it receives the light from said light source, and said control means comprises a position control circuit which is connected into a driving circuit of said driving means and regulates the relative position between said carrier member and said optical means, wherein said position control circuit stops said driving means when said photoelectric cell receives the light from said light source and generates an electrical signal.

3. An improvement as set forth in claim 1, wherein said microfiche camera further comprises a switch means for switching the direction of said driving means in response to the output signal generated when said carrier member has reached at the terminal position of its movement.

4. A microfiche camera for photographing a number of images in the form of a matrix on a wide microfilm comprising means for supplying an unexposed film, means for winding up an exposed film, optical means for forming an image of an object to be photographed on the surface of said film, shifting means for shifting said film in the direction of the width of the film relative to said optical means at an exposure position, loop means for forming a loop of said film, wherein said loop means comprises a first and a second loop chambers provided upstream and downstream of said exposure position, respectively, with respect to the direction of feeding of said film, two pairs of light source and a photoelectric cell, each pair being provided on opposed walls of each of said loop chambers, the light path between said light source and said photoelectric cell being interrupted by the loop of said film when said loop of said film reaches at a predetermined value, film driving means disposed in the vicinity of said exposure position for transporting said film in normal and reverse directions, and control means for controlling said supplying means and said winding up means in response to the normal and reverse switching of said film driving means and the output signal of said photoelectric cell to maintain the amount of the loop in said loop chambers constant.

5. A microfiche camera according to claim 4, wherein said control means comprises a gate circuit adapted for an output signal from said photoelectric cell of said first loop chamber and normal and reverse signals from said film driving means, the output from said gate circuit being supplied to said driving circuit of the driving source of said supplying means to switch the driving direction of said driving source.

6. A microfiche camera according to claim 4, wherein said control means comprises a gate circuit adapted to receive an output signal from said photoelectric cell of said second loop chamber and normal reverse signals from said film driving means, the output from said gate circuit being supplied to said driving circuit of the driving source of said winding up means to switch the driving direction of said driving source.

* * * * *